United States Patent [19]

Sharman

[11] Patent Number: 5,737,738

[45] Date of Patent: *Apr. 7, 1998

[54] DISTRIBUTED READ/WRITE REPLICATION WITH PRIMARY COPY FIRST WRITE AND PRIMARY COPY TRANSFER FEATURES

[75] Inventor: Geoffrey Sharman, Winchester, United Kingdom

[73] Assignee: International Business Machines Corporation, Armonk, N.Y.

[*] Notice: The term of this patent shall not extend beyond the expiration date of Pat. No. 5,586,310.

[21] Appl. No.: 622,722

[22] Filed: Mar. 26, 1996

Related U.S. Application Data

[63] Continuation of Ser. No. 158,119, Nov. 23, 1993, Pat. No. 5,586,310.

[30] Foreign Application Priority Data

Dec. 4, 1992 [GB] United Kingdom ............... 9225455

[51] Int. Cl.$^6$ ............................................. G06F 17/30
[52] U.S. Cl. ................................. 707/201; 707/10
[58] Field of Search ........................ 395/610, 617

[56] References Cited

U.S. PATENT DOCUMENTS

| | | | |
|---|---|---|---|
| 4,432,057 | 2/1984 | Daniell et al. | 395/608 |
| 4,620,276 | 10/1986 | Daniell et al. | 395/200.01 |
| 4,714,992 | 12/1987 | Gladney et al. | 395/622 |
| 4,714,996 | 12/1987 | Gladney et al. | 395/619 |
| 4,853,843 | 8/1989 | Ecklund | 395/619 |
| 5,261,094 | 11/1993 | Everson et al. | 395/617 |

FOREIGN PATENT DOCUMENTS

| | | | |
|---|---|---|---|
| 0 204 449 | 12/1986 | European Pat. Off. | G06F 15/16 |
| 3-113544 | 5/1991 | Japan . | |

OTHER PUBLICATIONS

A. Scherr, "Structures for Networks of Systems", IBM Systems Journal, vol. 26, No. 1, 1987 pp. 4–12.

Stumm et al., "Algorithms Implementing Distributed Shared Memory", IEEE Computer, vol. 23, No. 5, May 1990, pp. 54–64.

U. Inoue et al., "RINDA–A Relational Database Procesor for Non–Indexed Queries", 1st International Symp. Database Systems for Advanced Applications, Apr. 1989, pp. 382–386.

Stumm et al., "Fault Tolerant Distributed Shared Memory Algorithms", Proceedings of the Second IEEE Symp. On Parallel and Distributed Processing 1990, Dec. 1990, Dallas, TX, pp. 719–724.

M. Nelson, "Network Transparency", UNIX Review, vol. 8, No. 11, Nov. 1990, pp. 66–71.

Russell et al., "Distribution+Persistence=Global Virtual Memory", Proceedings of the 2nd Int.'l Workshop on Object Orientation in Operating Systems, 24–25 Sep. 1992 Dourdon, France, pp. 96–99.

Hilal et al., "Designing Large Electronic Mail Systems", 8th International Conference on Distributed Systems, 13–17 Jun., 1988, San Jose, CA., pp. 402–409.

(List continued on next page.)

*Primary Examiner*—Paul R. Lintz
*Attorney, Agent, or Firm*—Esther E. Klein

[57] ABSTRACT

When an update is made to a data record in a distributed, replicated data processing system, the update is first applied to a primary copy of the data record before being applied to any other copy to ensure that updates are applied in the correct time sequence. Apparatus and a method of operating a distributed data processing system is provided in which responsibility for the primary copy is transferable to whichever processor in the system requires most frequent update access, providing improved performance and availability of data. The primary copy may be partitioned and distributed across the system.

10 Claims, 7 Drawing Sheets

OTHER PUBLICATIONS

Caughey et al., "Implementing Fault–Tolerant Object Systems on Distributed Memory Multiprocessors", Proceedings of the 2nd Int.'l Workshop on Object Orientation in Operating Systems, 24–25 Sep. 1992, Dourdon, France, pp. 172–179.

Sarin et al., "A Flexible Algorithm for Replicated directory Management", 9th Int.'l Conference on Distributed Computing Systems, 5–8 Jun. 1989, Newport Beach, CA., pp. 456–464.

IBM CICS General Information Manual, GC33–0155–4, 5th Ed., Copyright 1982, 1992.

IBM CICS Family: Inter–Product Communication SC33–0824–00, 1st Ed., Copyright 1992.

C. H. C. Leung et al., "Analysis and Optimisation of Data Currency and Consistency in Replicated Distributed Databases", The Computer Journal, vol. 28, No. 5, 1985, pp. 518–523.

B. Ciciani et al., "Analysis of Concurrency–Coherency Control Protocols for Distributed Transaction Processing Systems With Regional Locality", IEEE Transactions on Software Engineering, vol. 18, No. 10, Oct. 1, 1992, pp. 899–914.

S. H. Son, "Replicated Data Management in Distributed Database Systems", SIGMOD Record, vol. 17, No. 4, Dec. 1988, pp. 62–69.

Y. Huang et al., "A Competitive Dynamic Data Replication Algorithm", IEEE Conf. No. 9, Apr. 19, 1993 pp. 310–317.

E. Babb, "Implementing a Relational Database by Means of Specialized Hardware" ACM Trans. Database Systems, vol.4, No. 1, Mar. 1979, pp. 1–29.

C. J. Date, "What is a Distributed Database System. Part I," The Relational Journal, Issue 1, Jun. 1987. pp. 24–29.

C. J. Data, "What is a Distributed Database System. Part II," The Relational Journal, Issue 2, Oct. 1987. pp. 12–15.

B. Lindsay et al., "A Snapshot Differential Refresh Algorithm", IBM Research Report, RJ 4992, Jan. 1986.

DISTRIBUTED READ/WRITE REPLICATION WITH PRIMARY COPY FIRST WRITE AND PRIMARY COPY TRANSFER FEATURES

This is a continuation of application Ser. No. 08/158,119, filed Nov. 23, 1993 now U.S. Pat. No. 5,586,310.

FIELD OF THE INVENTION

The present invention relates to distributed data processing systems.

BACKGROUND OF THE INVENTION

A distributed system typically consists of a number of data processing machines interconnected by a data communication network. An important class of distributed systems is that in which data at one site can be accessed transparently by data processing programs executing at another site. A general description of such distributed database systems is provided in the article 'What is a Distributed Database System' parts 1 and 2 (C J Date, The Relational Journal, Nos 1 and 2, 1987).

In a distributed database system, data may be split up and stored at several sites with the objective of locating it near to the processes which access it in order to reduce the data traffic on the communication network. However, it is usually the case that some of the sites have to access data located at another site. This remote access increases the cost and delay involved in data processing operations, so that the processing performance of these sites may be significantly worse than that of an equivalent stand-alone system with its own data.

An additional problem is that failure of the communications links or of data processing machines at other network sites may prevent remote data from being accessed at certain times. The availability of the data is therefore worse than if each site was a stand-alone system. Although the purpose of a distributed system is to allow users to share data resources, these negative effects can tend to deter users from relying on remote data access. This in turn detracts from the value of a distributed system compared with a simple centralized system.

A constant aim in the field of distributed systems, therefore, is to provide access to remote data with performance and availability which, as nearly as possible, match those obtainable for local data. One way of achieving this is to replicate data across the network, so that most data accesses can be satisfied by a local or nearby copy of the required data. This approach is described in an article by Sang Hyuk Son, SIGMOD Record, Vol 17 No 4 (1988). In this technique a balance must be struck between reductions in network traffic (and cost) for data accesses and the additional network traffic required to propagate updates to the multiple copies of the data.

Data replication is used in several types of distributed systems ranging from local area network file servers using caching to distributed database management systems using replicated data. An important class of replicated data systems is those in which a primary copy of a data object is held at a single data processor, with all other copies of that object being designated as secondary copies. Updates are applied to the primary copy first, in order to ensure that the time sequence of the updates is correct. Revisions to the secondary copies are then made based on the revised primary copy.

Replicating a data object is most useful when that object has a high proportion of read accesses and a low proportion of write accesses. This is because a read access can be performed on a single secondary copy, whereas a write access must be performed on the primary copy and propagated to all of the secondary copies. The cost of a write access is therefore higher than the cost of read. In a distributed system, updating a data object results in remote secondary copies of that object being invalidated and replaced by new copies transmitted across the network, so that that network costs must be added to the other costs of an update.

An extreme case of this approach is the use of "snapshots" which are intended as read-only replicas, for use by decision support applications. Lindsey et al describe how snapshots may be periodically refreshed in IBM research Report RJ4992 "Snapshot Differential Refresh Algorithm" (B. Lindsey et al, 1986) to keep them closer to the current state of the primary data. However, snapshots have no guaranteed integrity end may not be used for transactional data updates.

Where a large number of users update a shared file or database, secondary copies are quickly invalidated and a great deal of network traffic may be generated. This additional traffic may even exceed the reduction in network traffic which replication is supposed to bring about. The practical consequence, as discussed in the article 'Structures for Systems of Networks' (A L Scherr, IBM Systems Journal Vol 25, No 1, 1987) has been that replication methods have been held not to be useful for large shared files and databases, which are almost always centralized.

A significant problem in the prior art, therefore, is that although data replication is desirable it has been very difficult to achieve in the important case where the data is capable of being updated by users at multiple sites. In many practical situations, however, applications at distributed sites do not require access to the very latest data and may be able to function satisfactorily with data which is out of date by a known and controlled amount. Examples of this are applications which use rate tables which are updated periodically, and automated tellers systems which use an out-of-date account balance when authorizing cash withdrawals.

A problem can occur if a particular site is arranged to store the primary copy of a data item but in fact a remote site requires significantly more update access to that item than the site holding the primary copy. This would then mean that the remote site would have to transmit update requests to be made to the primary copy and then wait for revisions to be transmitted back to its secondary copy.

SUMMARY OF THE INVENTION

According to the present invention there is provided a distributed data processing apparatus and a method of distributed data processing, the method comprising storing replicated copies of a data record at a plurality of data processors; designating a first one of said copies at a first one of said data processors as the primary copy for update purposes; propagating updates of said primary copy to the other data processors holding secondary copies of the data record; and transferring responsibility for the primary copy from said first data processor to another one of said data processors whereby the secondary copy at said other processor is then designated as the primary copy of the data record for update purposes.

A dynamic transfer of ownership, or of responsibility for maintaining the primary copy, allows the primary to be located at the most suitable site at any particular time.

It is preferred that a remote processor holding a secondary copy of a data record can request responsibility for the primary copy using a record descriptor. A list may be kept at a central processor of descriptors of data records for which responsibility for the primary copy has been transferred to a remote data processor, which list is checked to prevent the grant of conflicting requests.

BRIEF DESCRIPTION OF THE DRAWINGS

In order that the invention may be fully understood a preferred embodiment thereof will now be described, by way of example only, with reference to the accompanying drawings in which.

DETAILED DESCRIPTION OF THE INVENTION

Figure 1:
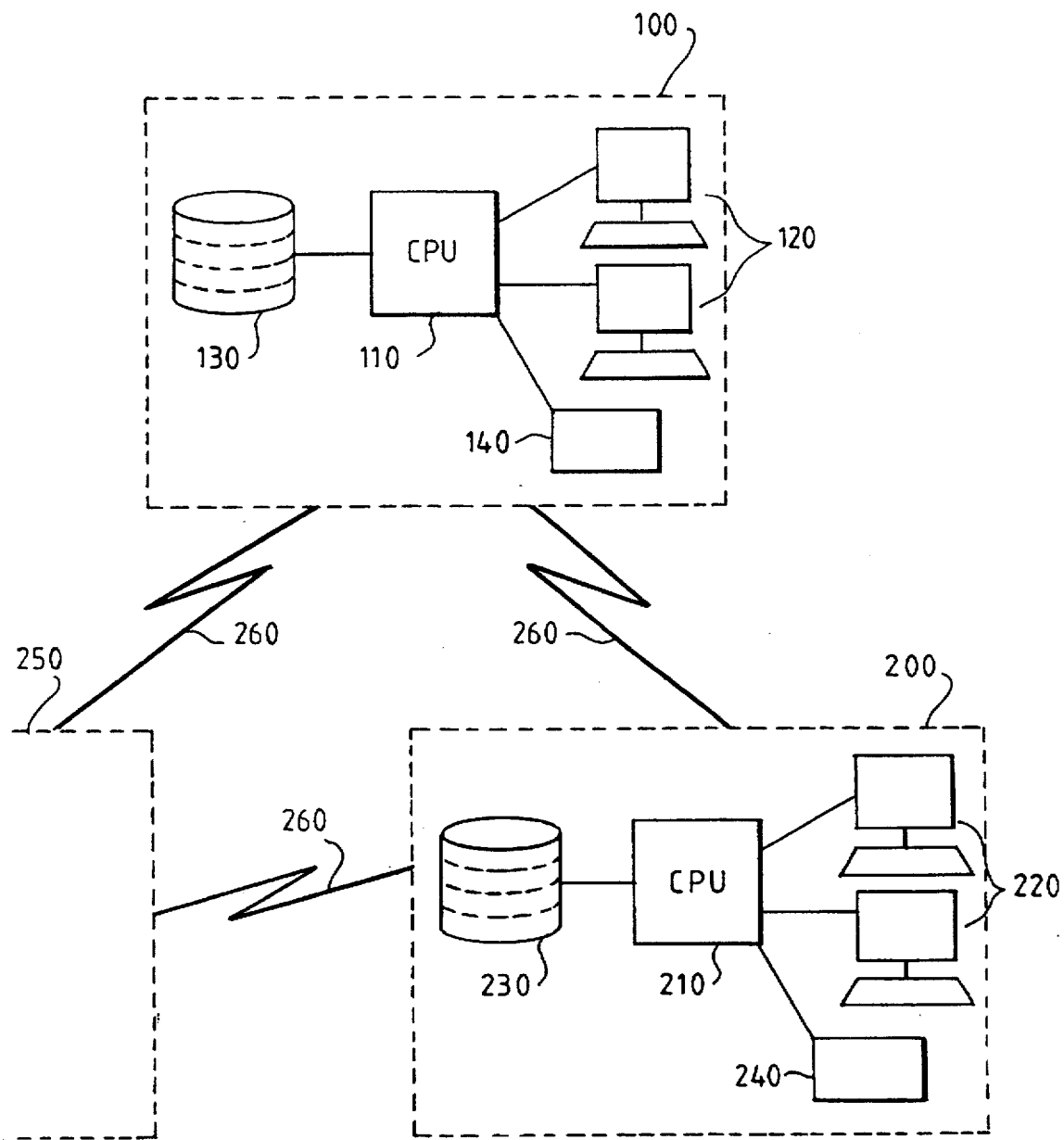
FIG. 1 shows part of a distributed data processing system suitable for the invention to be implemented.

Referring now to FIG. 1 part of a network of data processing machines is shown, in which data processors 100, 200 and 250 are linked by a data communication network 260. The data processors 100, 200 may comprise a central processing unit (CPU) 110, 210 with associated user terminals 120, 220 and data storage apparatus 130, 230. The data processors may also have additional peripheral apparatus such as automated teller machines (ATMs) or printers. This additional apparatus is shown generically as 140, 240.

Each of the processors 100–300 runs a database/data communications system, such as the CICS software from IBM Corporation, for supporting on line transaction processing applications. The CICS program is described in the CICS General Information Manual (GC33-0155-3) available from IBM. The linking together of data processors by a data network is described in IBM Manual "CICS Inter-Product Communication" (SC33-0824-0) whereby each data processor, using CICS Inter System Communication facilities can access data stored at another data processor. For example, if a particular data record required by CPU 210 is in fact stored on storage apparatus 130, the CICS program sends an access request via the network 260 from data processor 200 to data processor 100, which then replies with the requested data record. This method of accessing remote files is known as Function Shipping.

Generally data networks such as network 260 are expensive to install and to use, so efforts are often made to reduce the network traffic as far as possible. One way of achieving this is to split the data files between different machines on the network, so that data are stored at or physically near to the data processor which most commonly uses that data. However, this does not tend to reduce the network traffic if the same data file is used by a number of data processors, because all but one of these machines would still have to access the single file using the network, wherever that file was held.

A second approach therefore is to make multiple copies of the data file and store these copies at various data processors on the network. In this way copies of particular files can be stored at every data processor, or at least at those data processors which normally use those files. By replicating files at each data processor, we can ensure that accesses to data are local and do not need to be transmitted across the network.

One of the replicated copies is designated as the 'master' or 'primary' copy. Whenever an update is made to a file that update is applied first to the master copy, with updates to the other secondary copies being taken from the master and propagated to the secondary copies. Applying updates first to the single master copy ensures that the updates are applied in the correct time sequence. It is not necessary for the master copies of all files to be held by a single data processor. The location of the master copy for a particular file can be selected to be at or near the data processor which requires most access to that file.

Whenever an update is made to the master copy that updated record, or even a complete copy of the updated file, could be propagated to each of the secondary copies. However, this is likely to cause a large amount of network traffic which could well negate any of the advantages provided by replication. In the present embodiment this problem is addressed by allowing a predefined degree of uncertainty in each of the secondary copies. To achieve this each of the secondary copies has an associated currency period, with the expiry time of that currency period stored in a CICS control file associated with that file. Until the currency expiry time has passed the secondary copy is assumed valid, irrespective of whether the master copy has been updated in the mean time. It is not necessary for a secondary copy to contain all the records in the primary copy, and it may contain only those which are frequently needed at the secondary site. Thus, different secondary copies may contain different records.

Figure 2:
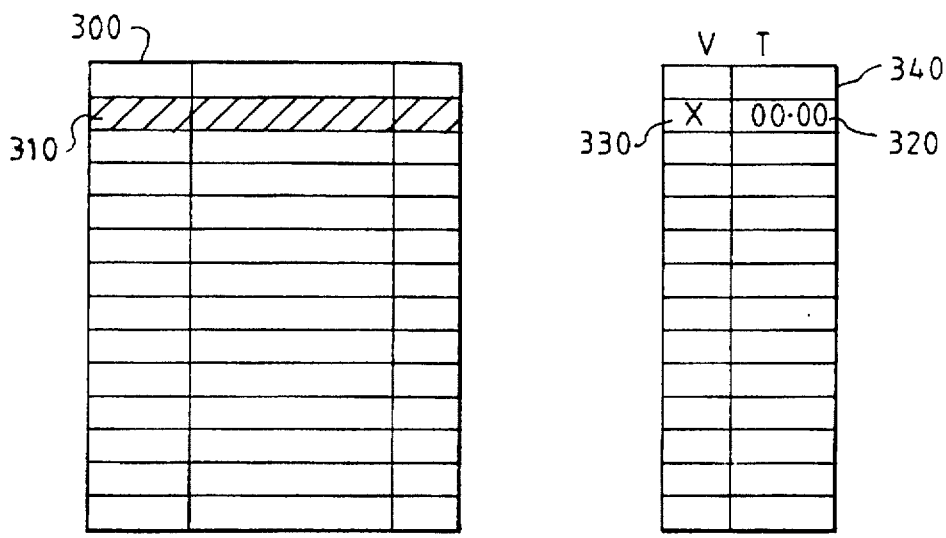
FIG. 2 shows schematically data and related control tables suitable for use in the system of FIG. 1.

FIG. 2 is a schematic diagram showing the association of a currency expiry time with the stored data records which make up a secondary copy. In the figure the data records are shown arranged in a CICS data file 300. Associated with each record in the file 300 is a currency expiry time (T) 320 and a validity flag (V) 330, which are stored in a file control table 340. The origin of the currency expiry time will be discussed below. When an attempt is made to read a data record 310 the validity flag 330 corresponding to that record 310 is first checked. If the validity flag 330 is not set to 'invalid', the current time is checked in order to determine whether the currency expiry time 320 has passed. If the currency expiry time 320 has not passed the data record 310 is read and operation continues as normal. If the currency expiry time 320 has passed the record 310 is not read, the validity flag 330 corresponding to that record is set to 'invalid' and an update of the secondary copy is requested. Further action described in connection with FIG. 4 can also be taken.

The currency expiry time T is associated with individual data records or with whole files. It can be propagated by the holder of the master copy whenever an update to a data record is propagated. Alternatively the currency expiry time can be reset by the holder of a secondary copy whenever an update is received from the master, by adding a pre-defined currency period to the time at which the master update occurred.

The actual currency period (the difference between the currency expiry time T and the time at which the master record is updated) for a data record is determined by the user with reference to the nature of the data record and, optionally, the current time or date. The main dependence, however, is on the nature of the data. An example situation is where the data stored in the distributed system relates to bank account balances. For the purposes of authorizing small cash withdrawals (for example using an automated teller machine (ATM) the bank as user may not consider it worth the extra networking and processing cost to update the balance held at local secondary copies more often than, say, every 24 hours.

As mentioned above, currency periods can be varied in dependence on the current time or date. For example, the currency period may need to be shorter on a Monday morning (the start of the business week) if updates are made particularly frequently at that time. Similarly the currency period could be extended at the weekend when there is little data updated activity.

Figure 3:
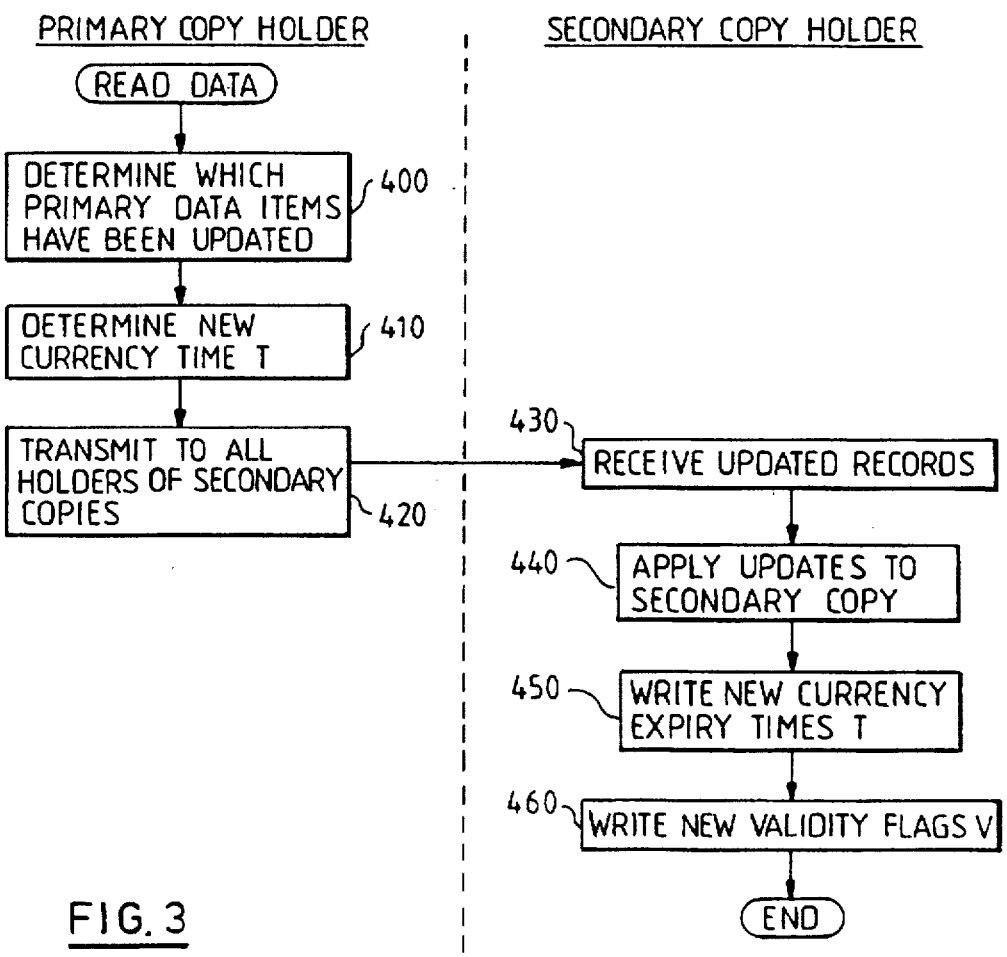
FIG. 3 is a flowchart showing a 'news bulletin' or 'pushdown' strategy for propagating updates in a distributed data processing system, which is implemented in an embodiment of the present invention.

FIG. 3 is a flow diagram showing one strategy for propagating updates from the primary copy of one or more data records to the secondary copies. This strategy, which will be referred to as the 'news bulletin' or 'pushdown' strategy, depends on the holder of the master copy knowing the currency expiry times of the second copies, but need not be dependent on whether any read requests are made. Some of the steps shown in the flow chart are performed by the primary copy holder, with the remainder being performed by each of the secondary copy holders. Communication between the primary and secondary copy holders is achieved via the CICS InterSystem Communication facilities, or some equivalent facility such as a reliable messaging facility.

The process starts with the primary copy holder determining which data records in the primary copy have been updated since the last update was propagated to the secondary copies, at step 400. In the present embodiment step 400 is performed before the currency expiry time held at the secondary copies is reached. At step 410 a new currency expiry time T is calculated for the set of data records, based on the current time and predetermined information relating to the nature of the data records. A record of this currency expiry time is kept at the primary copy holder.

At step 420 the updated data records, along with the currency expiry times associated with the whole file, are propagated to the secondary copy holders. The first step performed by a secondary copy holder is to receive the updates 430 and apply them 440 to the secondary copy of file. At step 450 the new currency expiry times associated with these records are stored. Finally, if any validity flags associated with these records had been set to 'invalid', indicating that the data record's validity period had expired, those flags are reset at step 460. This strategy ensures that each secondary copy is always usable if updates are applied to the secondary copies before expiry of their currency periods.

Figure 4:
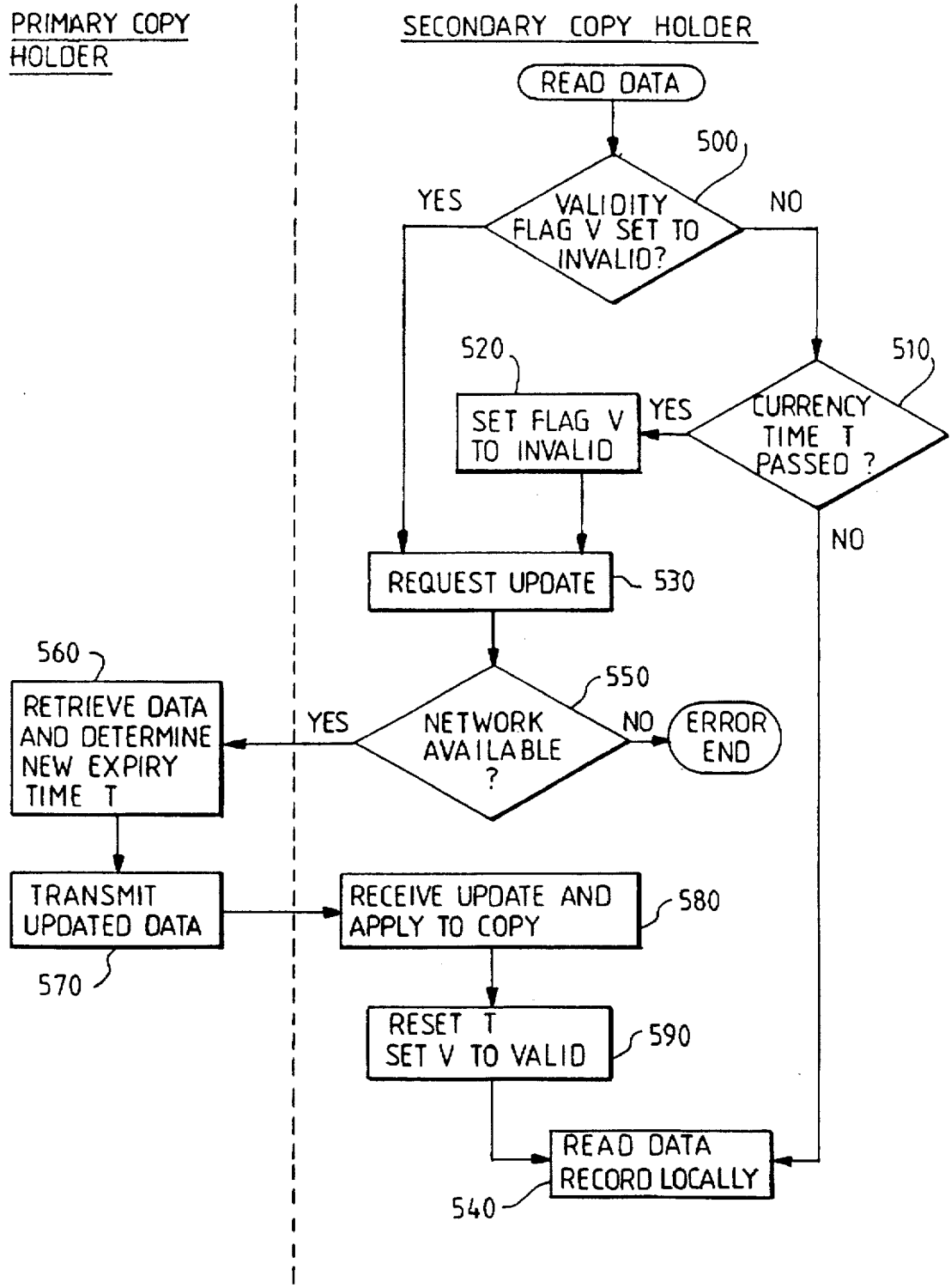
FIG. 4 is a flowchart showing an 'on demand' or 'pulldown' strategy for propagating updates in a distributed data processing system, which is implemented in an embodiment of the present invention.

FIG. 4 is a flow diagram showing a second strategy for propagating updates from the primary copy of the file to the secondary copies. This strategy will be referred to as the 'on demand' or 'pulldown' strategy. Again, some of the steps detailed in the flow chart are performed by the primary copy holder, with the remainder being performed by each of the secondary copy holders.

The process shown in FIG. 4 starts when the secondary copy holder initiates a read operation on a data record held in the secondary copy. The validity flag corresponding to the data record is checked at step 500. If the flag is set to 'invalid', control is passed directly to step 530 where an update to that data record is requested. In these circumstances the use of the validity flag has removed the need for any further checks on the validity of the data record. If however the validity flag is set to 'valid' then a further check is made at step 510 to determine whether the current time is later than the currency expiry time associated with the data record. If the current time is earlier than T, the data record can be read from the local secondary copy at step 540 and the process terminates successfully.

If it is found at step 510 that the currency expiry time has passed, control is passed to step 520 where the validity flag is set to 'invalid' and to step 530 where an update to that data record is requested from the primary copy holder. However, there maybe circumstances where this request cannot be met. For example, the primary copy holder may have failed or the communication network may be unavailable. If the update request can be serviced then at step 550 control is passed to the primary copy holder, which attempts to retrieve the requested record at step 560. If the record is found, the primary copy holder calculates a new currency expiry time and transmits both the updated record and the new time to the secondary copy holder at step 570. If the primary data record has not been modified since the last time it was sent to the secondary copy holder, then an affirmative signal plus the new currency expiry time may be sent instead.

If at step 550 it is found that the update request cannot be serviced, the process terminates unsuccessfully. This situation (data unavailable) is handled in a conventional manner by the program which made the original request to read the data record.

The update is received by the secondary copy holder and applied to the secondary copy at step 580. The new currency expiry time T is saved at step 590 and the validity flag V associated with the data record is reset to 'valid'. The local copy of the data record is then read at step 540 and the process ends successfully. This strategy minimizes network traffic by transmitting data records only when they have been specifically requested by an application, and no valid copy exists locally, at the expense of these records sometimes being unavailable.

It is possible to use a combination update strategy which combines features of the 'on demand' and the 'news bulletin' strategies. In this case the secondary copy held at a remote site is initiated as an empty file holding no data. This can then be built into a set of data records appropriate to the needs of that remote site using the 'on demand' strategy. Once the working set of data records has been established (when the 'on demand' strategy has been in operation for a appropriate time) operation can switch to the 'news bulletin' strategy. Alternatively both strategies can be operated concurrently, in which case the secondary copy held at the remote site would consist of data records which have been required by the remote site and data records which have recently been updated at the primary copy. This combination strategy may incur some additional processing as the secondary copy is built up, but thereafter will perform as well as the 'news bulletin' strategy. It has the advantage that recovery is automatic if the secondary copy is lost for any reason.

Figure 5:
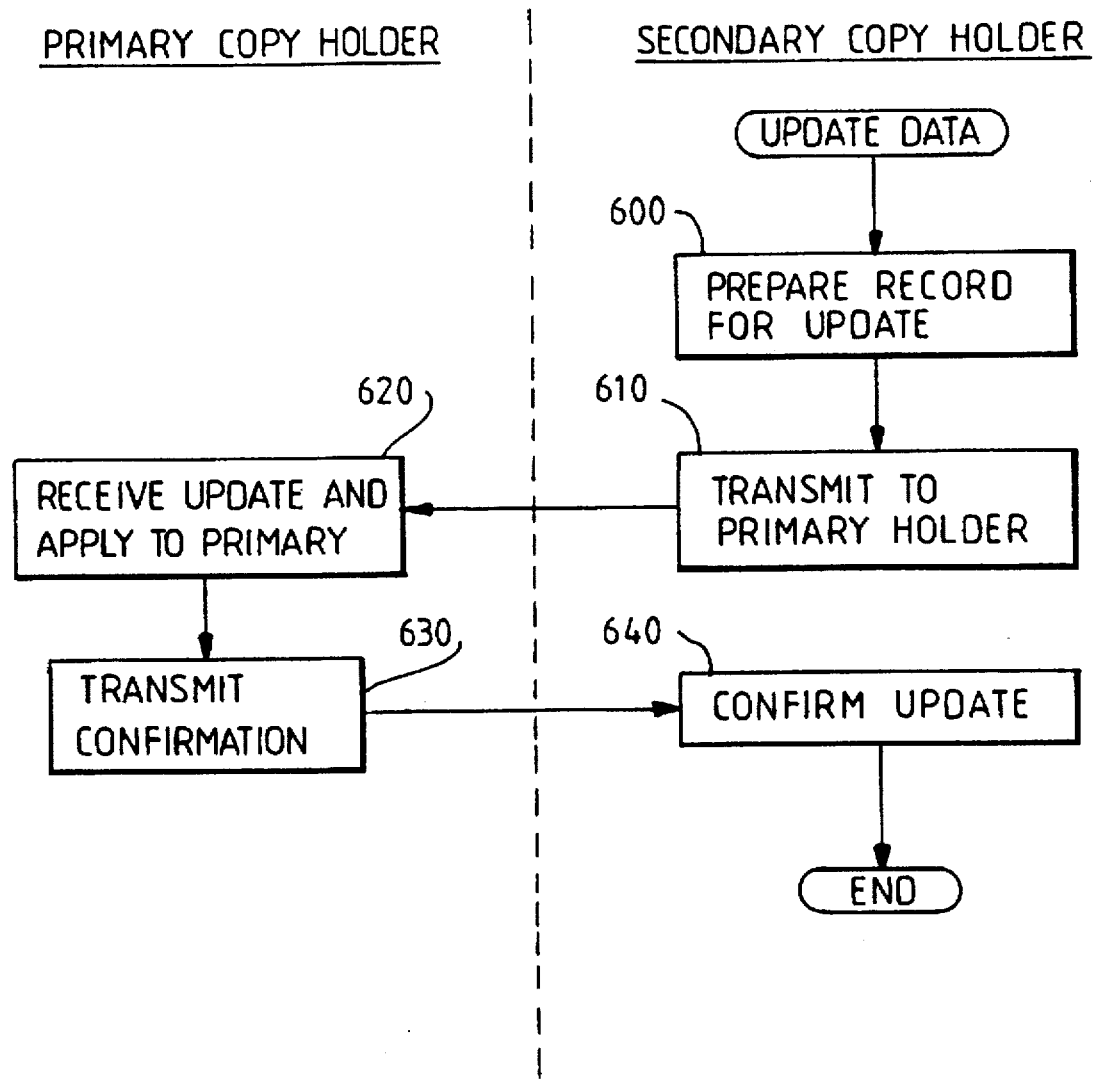
FIG. 5 shows the conventional strategy for making updates to a central primary copy.
Figure 6:
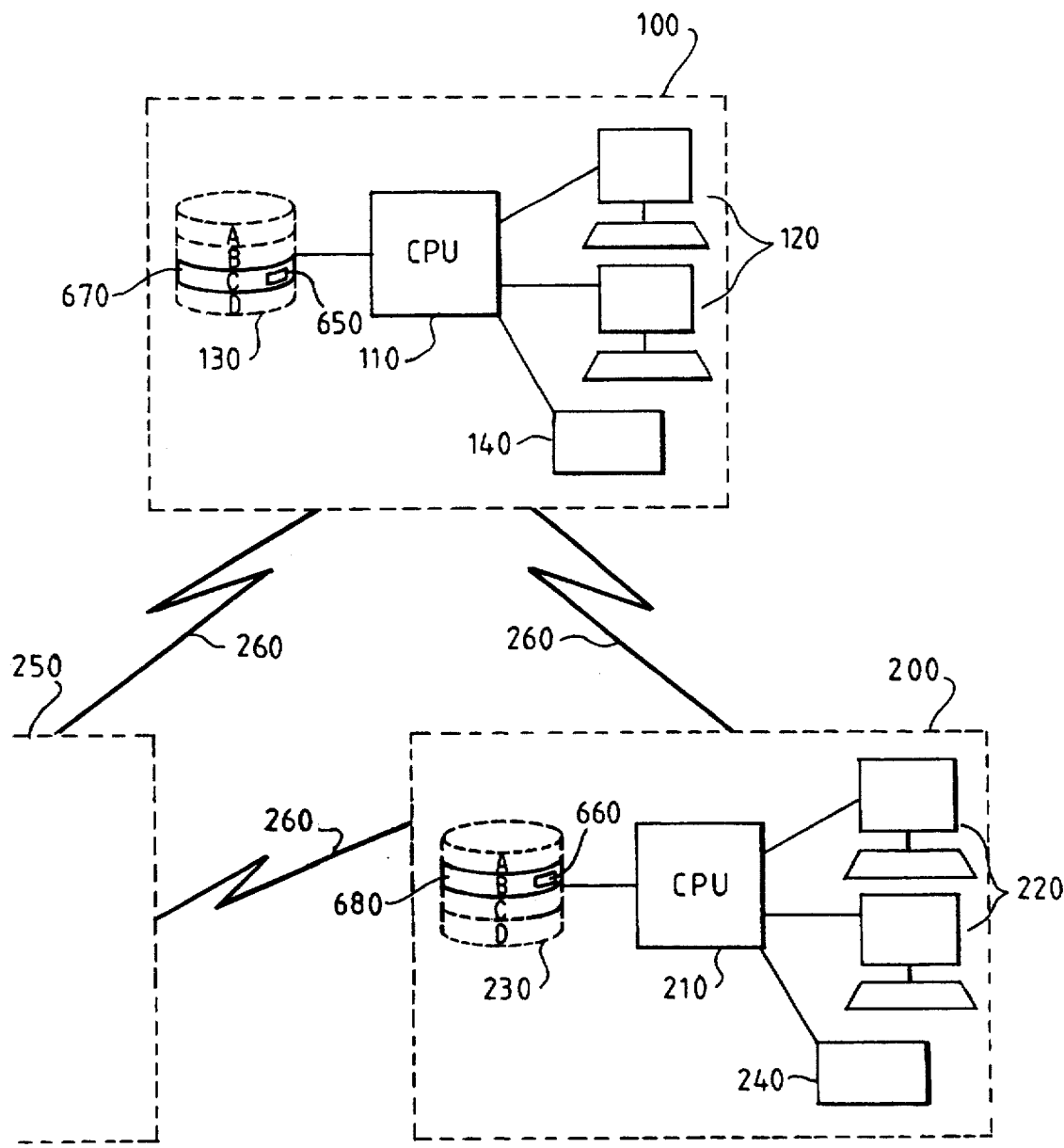
FIG. 6 shows part of a distributed of data processing systems with a file having distributed primary copies, in which the present invention is implemented.

When an update is made to a data record in a distributed, replicated, system, the update is applied to the primary copy before being applied to any other copy of the data record. This is to ensure that updates are applied in the correct time sequence. However, in many distributed data processing systems (such as transaction processing systems) data are captured at remote sites and then transferred to the primary copy. If a single site is the primary copy holder for all of the data then, since these data capturing operations must update the primary copy their performance is no better than would be the case in a non-replicated system. The update flow is shown in FIG. 5, in which a remote data processor makes an update to a primary copy file, using existing CICS Inter-System Communication facilities. At step 600 the remote data processor prepares the record for update and transmits it to the central data processor at step 610. At step 620 this record is received and the update applied to the primary copy of the file. At step 630 a confirmation of update is generated and transmitted to the remote site, and received at step 640. Note that the update may fail completely at step 610 if a network fault occurs. One solution to these performance and availability problems is shown in FIG. 6 in which the primary copy itself is distributed across the network. In other words, as far as possible each site is the primary copy holder for those data records which it commonly requires to update. The central site now holds secondary copies of these data records, so that a complete file is available for replication to other sites or for central processing.

FIG. 6 shows a distributed data processing system similar to that shown in FIG. 1. The data stored on data storage apparatus 130, 230 is shown schematically as comprising four partitions A, B, C and D. Data processor 100 which may be the central site, holds the primary copy 670 of partition C and data processor 200 holds the primary copy 680 of partition B. Each data processor may hold secondary copies of other partitions if this is appropriate to the data access needs of that data processor. It is important that the partitions are defined to be non-overlapping, so that there is only one primary copy of any given record. This can be achieved by partitioning the records on key range, or some similar method. In general, each partition has a descriptor 650, 660 associated with it which enables the data processor to determine whether a particular record is in this partition or not.

Figure 7:
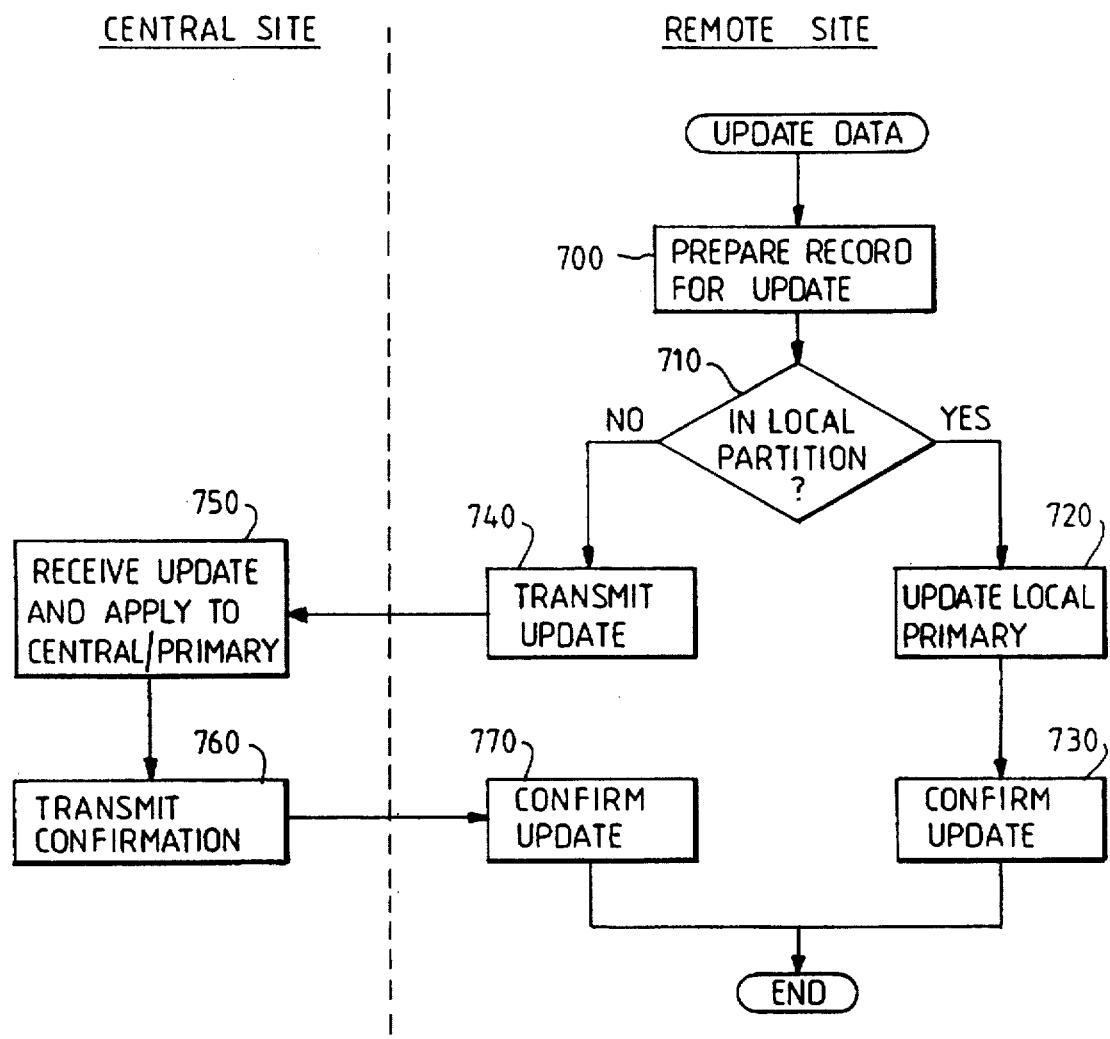
FIG. 7 is a flow diagram showing an update strategy employed in the system of FIG. 6 in which a remote processor makes the update.

The revised update flow is shown in FIG. 7, in which a remote data processor updates a record. At step 700, the remote data processor prepares the record for update and, at step 710, tests the local partition descriptor to determine whether the record should fall within the primary copy partition held at that site. If so, the update is applied to this partition at step 720 and a confirmation of update generated at step 730. If the updated record does not fall within the local partition, it is transmitted to the central site at step 740, and received and applied to the central file (and to the primary copy if this is different) at step 750. A confirmation is generated and transmitted to the remote site at step 760. If the local partition is chosen so as to contain a majority of the records updated at that site, this method can reduce network traffic considerably. It also increases availability, since only those updates which must be transmitted to the central site can fail due to network faults.

Figure 8:
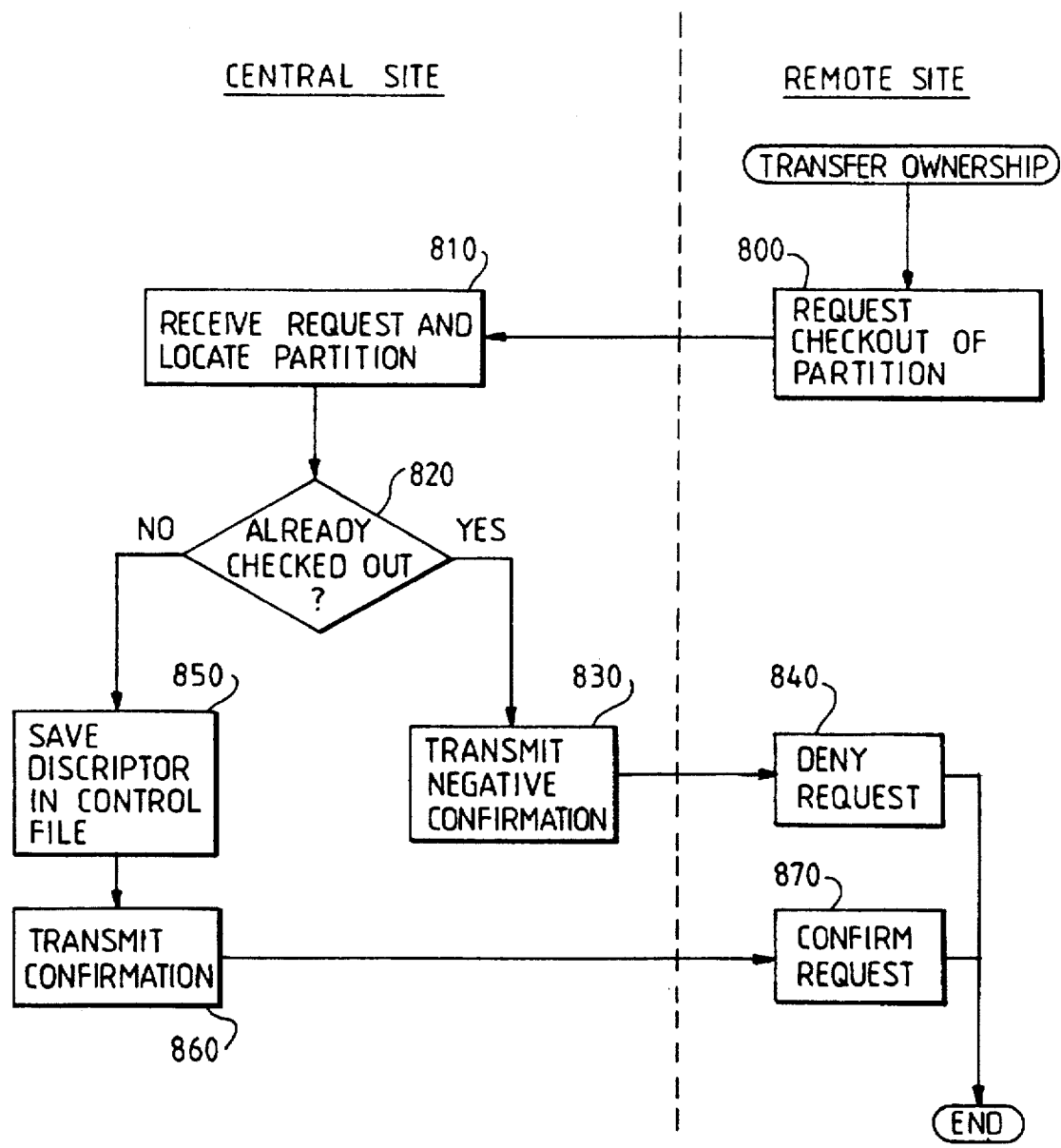
FIG. 8 is a flow diagram showing the transfer of responsibility for the primary copy of a data record from central to a remote site according to the present invention.

In some situations a particular remote site may be initialized as the primary copy holder for a set of data records, but at a later time a different, remote, site may need to apply a large number of updates to the primary copy of those data records. The possibilities for disruption because of network failures and the additional network traffic generated by this change in the update requirements of the data processing sites can negate some of the advantages achieved by using a distributed primary copy. A solution to this problem is to allow the dynamic transfer, between sites, of responsibility for holding the primary copy. Such an arrangement is called a "checkout/checkin" strategy and will now be described in connection with FIG. 8.

At step 800, the data processor at the remote site requests responsibility for a specified partition of the file, by transmitting the partition descriptor to the central site. This partition is located at step 810, and compared with the descriptors of already checked out partitions, held in a control file, at step 820. If the requested partition has been checked out to another site, or overlaps a partition which has already been checked out, then the request is failed. An error message is generated and transmitted to the requesting site at step 830. At step 840, this message is received and the process terminates unsuccessfully. If, however, the requested partition has not been checked out, then its descriptor is saved in the control file at step 850. A confirmation message is built at step 860 and transmitted to the remote site, which now becomes the primary copy holder. The message is received at step 870 and the process completes successfully. Later, the remote data processor may go through a similar process to relinquish control of this partition, thus "checking it in" to the central site.

This dynamic transfer of responsibility for the primary copy can be incorporated into the combination update strategy described above. At the start of operation of a network of data processors the primary copy of all of the data may be held at a single site, to be referred to as the central site. As processing takes place, copies of data records will be distributed around the network by 'news bulletin' or 'on demand' processing. After a time, a distributed site may request ownership of a specified partition and primary copy responsibility for this partition may be dynamically transferred to that appropriate site. Later, responsibility may be transferred back to the central site or to another site, as the workload on the network changes with time.

While the invention has been particularly shown and described with reference to a best mode for practicing the invention, it will be understood by those skilled in the art that changes in form and detail may be made without departing from the scope of the invention.

I claim:

1. A method of distributed data processing comprising the steps of:

storing replicated copies of a data record (310) at a plurality of data processors (400, 200, 250);

in response to an access request at a one of said plurality of data processors for the data record, accessing the copy of the data record stored at the one of said plurality of data processors;

designating a first one of said copies at a first one of said data processors as the primary copy for update purposes and the other copies as secondary copies;

applying updates to the data record firstly to the primary copy and subsequently propagating (420, 570) updates of said primary copy to the other data processors holding secondary copies of the data record; and transferring (850) responsibility for the primary copy from said first data processor to a second one of said data processors wherein the secondary copy at the second processor is then designated as the primary copy of the data record for update purposes such that future updates to the data record received at any of said plurality of data processors will firstly be applied at the second processor and will subsequently be propagated to the other data processors.

2. A method of distributed data processing according to claim 1 wherein responsibility for the primary copy is transferred in response to a request (800) from said second processor.

3. A method of distributed data processing according to claim 1 further comprising the steps of:

associating descriptors (650, 660) with specific non-overlapping groups (670, 680) of stored primary copies of data records; and transmitting (800) the descriptor for a specific group from a remote data processor to a central data processor, thereby to request a transfer of responsibility for said group of stored primary copies of data records to the remote processor.

4. A method of distributed data processing according to claim 3 further comprising the steps of:

establishing (850) at a central data processor a list of descriptors for groups of data records for which responsibility for the primary copy has been transferred to a remote data processor;

updating said list when transfers of responsibility occur;

checking said list (820) on receipt of a request for a transfer of responsibility; and refusing the request if responsibility has been transferred to a remote data processor, or granting the request if responsibility has not been transferred to a remote data processor.

5. A method of distributed data processing according to claim 4 further comprising the step of transmitting a descriptor to a central data processor from a remote data processor having responsibility for the primary copy, thereby to relinquish responsibility for the group of primary data records.

6. A method of distributed data processing according to claim 1 further comprising the steps of:

storing a currency expiry time (320) associated with a secondary copy at the data processor storing said secondary copy; and in response to a request for data access at said data processor, checking (510) whether the currency expiry time (320) has passed.

7. A distributed data processing apparatus comprising:

a first data processor (100) having means for storing (130) a first copy of a data record;

means for designating said first copy as a primary copy to which updates of the data record are to be applied prior to being applied to other copies;

one or more remote data processors (200) having means for storing (230) secondary copies of the data record and means for accessing the secondary copy of the data record stored at the remote data processor in response to a request at the remote data processor for the data record;

means for propagating (420, 570) to the secondary copies updates applied to the primary copy; and means for transferring responsibility (850) for the primary copy from the first data processor to one of the remote data processors such that future updates to the data record will firstly be applied at said remote processor and will subsequently be propagated to the other data processors.

8. Distributed data processing apparatus accordingly to claim 7 wherein said data processor further comprising means for requesting (800) responsibility for the primary copy.

9. A distributed data processing apparatus according to claim 7 further comprising means for associating descriptors (650, 660) with specific non-overlapping groups (670, 680) of stored primary data records;

means at a central processor for storing a list of descriptors for groups of data records for which responsibility has been transferred to a remote data processor;

means for updating said list when transfers of responsibility occur;

means for checking said list (820) on receipt of a request for a transfer of responsibility; and means for refusing the request when responsibility has been transferred to a remote data processor or transferring responsibility to the requesting processor if responsibility has not been transferred to a remote processor.

10. An article of manufacture for use in a computer system for distributed data processing, said article of manufacture comprising a computer readable storage medium having a computer program code embodied in said medium which may cause the computer to:

store replicated copies of a data record (310) at a plurality of data processors (100, 200, 250);

in response to an access request at a one of said plurality of data processors for the data record, access the copy of the data record stored at the one of said plurality of data processors;

designate a first one of said copies at a first one of said data processors as the primary copy for update purposes and the other copies as secondary copies;

apply updates to the data record firstly to the primary copy and subsequently propagating (420, 570) updates of said primary copy to the other data processors holding secondary copies of the data record; and transfer (850) responsibility for the primary copy from said first data processor to a second one of said data processors wherein the secondary copy at the second processor is then designated as the primary copy of the data record for update purposes such that future updates to the data record will firstly be applied at the second processor and will subsequently be propagated to the other data processors.

\* \* \* \* \*